United States Patent [19]

Dix, Jr.

[11] Patent Number: 4,996,945
[45] Date of Patent: Mar. 5, 1991

[54] ELECTRONIC ANIMAL CONTROL SYSTEM WITH LIGHTNING ARRESTER

[75] Inventor: Thomas S. Dix, Jr., Wayne, Pa.

[73] Assignee: Invisible Fence Company, Inc., Wayne, Pa.

[21] Appl. No.: 519,159

[22] Filed: May 4, 1990

[51] Int. Cl.$^5$ .............................................. A01K 15/00
[52] U.S. Cl. ...................................... 119/29; 361/120
[58] Field of Search .................. 119/29, 106; 361/117, 361/120, 121; 174/2

[56] References Cited

U.S. PATENT DOCUMENTS

| | | | |
|---|---|---|---|
| 3,753,421 | 8/1973 | Peck | 119/29 |
| 4,455,586 | 6/1984 | McCartney | 361/120 X |
| 4,677,518 | 6/1987 | Hershfield | 361/120 X |
| 4,745,882 | 5/1988 | Yarnall, Sr. et al. | 119/29 |
| 4,903,161 | 2/1990 | Huber et al. | 361/120 X |
| 4,918,565 | 4/1990 | King | 361/120 |

FOREIGN PATENT DOCUMENTS

| | | | |
|---|---|---|---|
| 0123126 | 10/1984 | European Pat. Off. | 361/120 |
| 2455843 | 1/1981 | France | 119/29 |

OTHER PUBLICATIONS

Schematic Diagram of Global Computer Supplies' "Lightning Sponge", Model 22, Labeled Exhibit #1.
Joslyn Technical Data of "Data and Signal Cable Protector", Series 1700, Labeled Exhibit #2.

Primary Examiner—Robert P. Swiatek
Assistant Examiner—Todd E. Manahan
Attorney, Agent, or Firm—Dann, Dorfman, Herrell and Skillman

[57] ABSTRACT

An animal control system with a lightning arrester is provided for controlling the movement of an animal relative to a predetermined outdoor area. A signal transmitter produces an output signal of predetermined frequency. A wire loop transmitting antenna is electrically connected with the transmitter and is positioned at the predetermined outdoor area to transmit the output signal from the transmitter. A portable receiver responsive to the signal from the antenna is carried by the animal. The portable receiver produces an animal control output in the form of an annoying tone or an electrical shock to the animal when the animal moves into a selected vicinity of the antenna. A lightning arrester is electrically connected between the transmitter and the antenna. The lightning arrester includes a pair of choke coils respectively connected from the transmitter to opposite sides of the antenna. Zener diode are respectively used to ground the transmitter side of the choke coils whenever a voltage in excess of the breakdown voltage appears across one of both of of the Zener diodes. Gas tubes respectively ground the antenna side of the choke coils whenever a voltage in excess of the sparkover voltage appears across one or both of the gas tubes. In addition, a gas tube is connected across the antenna on the antenna side of the choke coils.

16 Claims, 1 Drawing Sheet 4,996,945

ELECTRONIC ANIMAL CONTROL SYSTEM WITH LIGHTNING ARRESTER

FIELD OF THE INVENTION

The present invention relates to an electronic animal control system with a lightning arrester and, more particularly, to an electronic animal control system for controlling the movement of an animal relative to a predetermined outdoor area in which a lightning arrester is provided to protect the system from damage caused by lightning strikes.

BACKGROUND OF THE INVENTION

In order to control the movement of an animal relative to a predetermined outdoor area, electronic animal confinement systems have been developed. A conventional electronic system includes a signal transmitter employing an antenna in the form of a wire which is either placed on the ground or, more frequently, buried slightly beneath the ground. The wire antenna is typically arranged as a loop to surround the particular outdoor area in which an animal is to be confined. The loop of wire serves as a transmitting antenna when energized by the transmitter to radiate a signal in the vicinity of the wire antenna.

An electronic receiver responsive to the signal emitted by the wire loop antenna is typically carried on a collar of the animal. The electronic receiver is typically powered by a small dry-cell battery contained within the receiver. A control circuit is associated with the receiver to produce an animal control output in the form of some type of physical effect, such as an annoying noise or a physical shock, to the animal. The control output is produced by the receiver whenever the animal moves within a predetermined vicinity of the wire loop antenna.

One of the problems associated with electronic animal confinement systems has been the potential for damage to the transmitter circuitry caused by lightning strikes. In order to protect the transmitter circuitry, conventional lightning arresters have been employed. Unfortunately, the conventional lightning arresters have not always provided satisfactory protection to the transmitter circuitry.

Pursuant to the present invention, an electronic animal control system is provided which includes a highly effective lightning arrester.

SUMMARY OF THE INVENTION

In accordance with the present invention, an animal control system with a lightning arrester is provided. The animal control system is an electronic system which serves to control the movement of an animal relative to a predetermined outdoor area.

The system includes a signal transmitter for producing an output signal of predetermined frequency. First and second output terminals are provided to permit the signal to be output from the signal transmitter.

A wire loop antenna is positioned at the predetermined outdoor area where the movement of the animal is to be controlled. The wire loop antenna is electrically connected with the transmitter to enable the signal to be transmitted from the antenna at the predetermined outdoor area. For this purpose, the antenna includes a first terminal connected with the first terminal of the transmitter and a second terminal connected with the second terminal of the transmitter.

A portable, battery-powered receiver responsive to the signal from the antenna is carried by the animal. The receiver produces an animal control output in the form of some type of physical effect to the animal whenever the animal moves into a selected vicinity of the antenna. As a result of the animal control output, the movement of the animal is controlled relative to the predetermined area. Because of the physical effect produced by the animal control output, such as an electrical shock, further movement of the animal toward the antenna is deterred.

In order to protect the system from lightning strikes, a lightning arrester is electrically connected between the transmitter and the antenna. The lightning arrester includes a first conductor which is electrically connected between the first terminal of the transmitter and the first terminal of the antenna. Similarly, a second conductor is electrically connected between the second terminal of the transmitter and the second terminal of the antenna. A first choke coil is electrically connected along the first conductor and a second choke coil is electrically connected along the second conductor.

A first threshold-voltage conduction device, in the form of a Zener diode, is electrical connected between ground and the first conductor. More specifically, the first threshold-voltage conduction device is connected between ground and a connection on the first conductor located between the first terminal of the transmitter and the first choke coil. The first threshold-voltage conduction device becomes conductive so as to ground the first conductor on the transmitter side of the first choke coil whenever voltage across the first threshold-voltage conduction device reaches a first predetermined threshold. Similarly, a second threshold-voltage conduction device, in the form of a Zener diode, is electrically connected between ground and the second conductor. The second threshold-voltage conduction device is specifically connected between ground and a connection on the second conductor located between the second terminal of the transmitter and the second choke coil. The second threshold-voltage conduction device becomes conductive so as to ground the second conductor on the transmitter side of the second choke coil whenever voltage across the second threshold-voltage conduction device reaches a second predetermined threshold. Preferably, the first and second thresholds are set at approximately the same level.

A third threshold-voltage conduction device, in the form of a gas tube, is electrically connected between ground and the first conductor. More specifically, the third threshold-voltage conduction device is connected between ground and a connection on the first conductor located between the first choke coil and the first terminal of the antenna. The third threshold-voltage conduction device becomes conductive so as to ground the first conductor on the antenna side of the first choke coil whenever voltage across the third threshold-voltage conduction device reaches a third predetermined threshold. Similarly, a fourth threshold-voltage conduction device, in the form of a gas tube, is electrically connected between ground and the second conductor. More specifically, the fourth threshold-voltage conduction device is connected between ground and a connection on the second conductor located between the second terminal of the antenna and the second choke coil. The fourth threshold-voltage conduction device becomes conductive so as to ground the second conductor on the antenna side of the second choke coil whenever voltage across the fourth threshold-voltage conduction device reaches a fourth predetermined threshold. Desirably, the third and fourth predetermined thresholds are set at approximately the same level.

A fifth threshold-voltage conduction device, in the form of a gas tube, is connected across the first and second conductors on the antenna side of the choke coils. The fifth threshold-voltage conduction device is specifically connected from a connection on the first conductor located between the first choke coil and the first terminal of the antenna to a connection on the second conductor located between the second choke coil and the second terminal of the antenna. The fifth threshold-voltage conduction device becomes conductive so as to short the first conductor to the second conductor on the antenna side of the choke coils whenever voltage across the fifth threshold-voltage conduction device reaches a fifth predetermined threshold. The fifth predetermined threshold may be set at approximately the same level as the third and fourth predetermined thresholds.

BRIEF DESCRIPTION OF THE DRAWINGS

The foregoing summary, as well as the following detailed description of the preferred embodiments of the present invention, will be better understood when read in conjunction with the accompanying drawings in which.

DETAILED DESCRIPTION OF THE PREFERRED EMBODIMENTS

Figure 1:
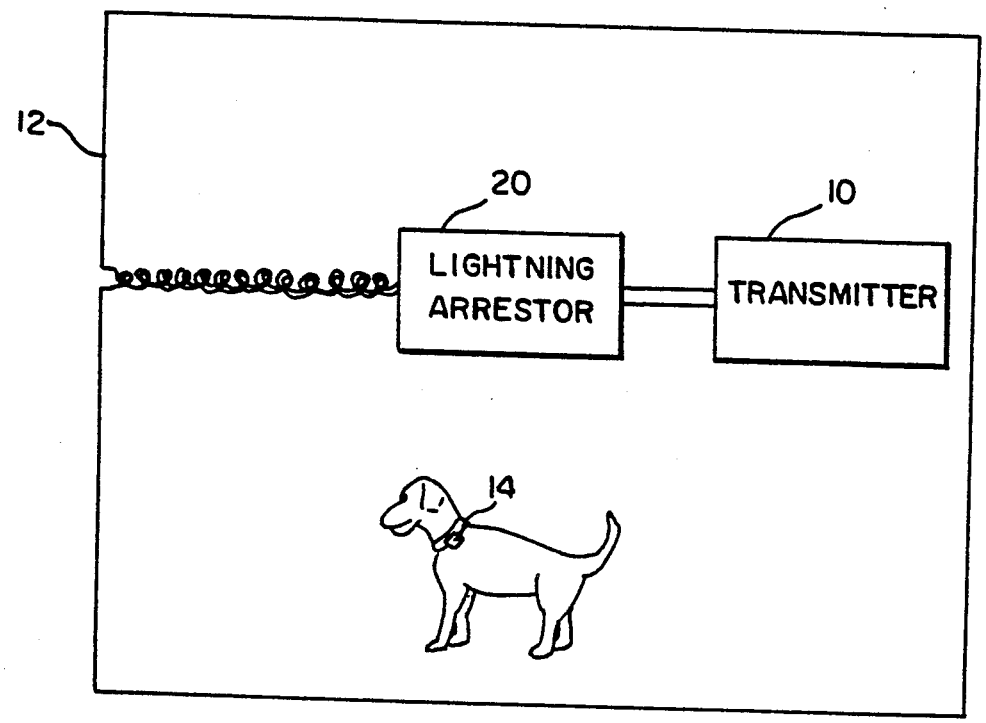
FIG. 1 is a schematic representation of an electronic animal control system having a lightning arrester in accordance with the present invention.

Referring to FIG. 1, an electronic system for controlling the movement of an animal relative to a predetermined outdoor area is depicted. The system includes a signal transmitter 10 having a transmitting antenna 12 associated with the outdoor area in which the animal is to be confined or, alternatively, from which the animal is to be kept.

The transmitting antenna 12 is in the form of a wire loop antenna which is positioned to surround an outdoor confinement area, such as a yard or a selected portion of the yard. The wire loop transmitting antenna 12 may be positioned above the ground or may be buried slightly below the ground.

The signal transmitter 10 functions to produce an output signal having a predetermined frequency. Preferably, the signal is produced for transmission at the transmitting antenna 12 at a sub-broadcast band frequency such as approximately 10 Khz. The signal transmitter 10 may be of the type marketed by Invisible Fence Company, Inc., under Model No. CT4000, which produces an output signal of approximately 10.75 Khz. The signal transmitter is powered by a suitable power source such as a conventional power outlet in a house.

The system also includes an electronic receiver 14 which operates at low power and is of a suitable size to be carried by the animal. As shown in FIG. 1, the electronic receiver 14 is of sufficient size to be attached to an animal collar. A portable dry-cell battery is incorporated within the electronic receiver to supply the necessary power for operation of the receiver. The electronic receiver 14 may be of the type marketed by Invisible Fence Company, Inc., under Model No. R5000.

The electronic receiver 14 operates to control the movement of the animal. Within a selected vicinity of the transmitting antenna 12, the electronic receiver 14 is responsive to the signal transmitted by the antenna 12 for producing a control output, such as an annoying tone or an electrical shock, to the animal. As the animal approaches the transmitting antenna 12, the strength of the signal received by the electronic receiver 14 increases. When the signal received by the electronic receiver reaches a predetermined level or meets some other predetermined condition, the control output is generated by the receiver 14 in order to deter the animal from moving any closer toward the transmitting antenna 12.

Figure 2:
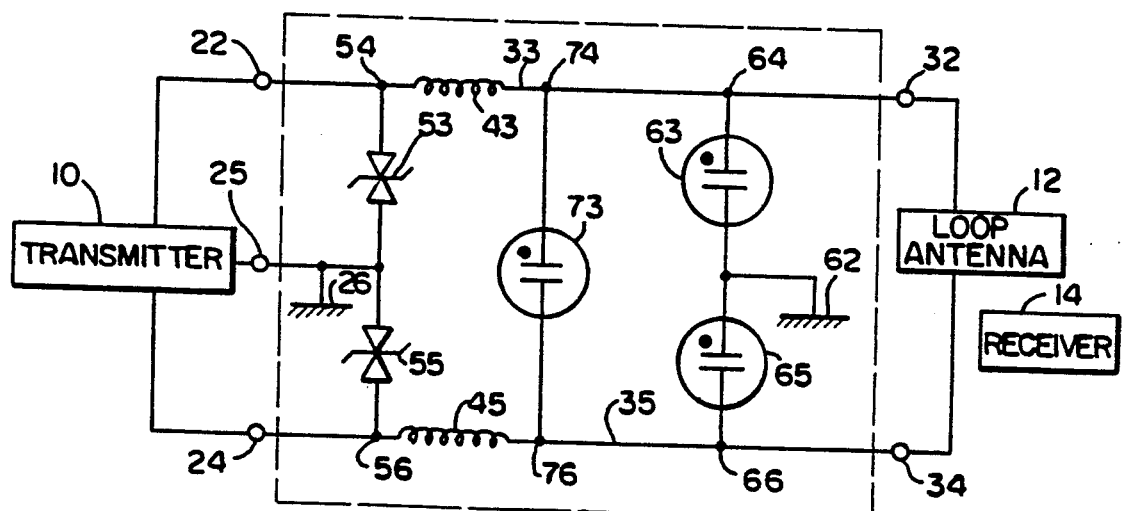
FIG. 2 is a block diagram of the electrical components of the system including a schematic representation of the electronic circuitry of the lightning arrester.

In order to protect the transmitter circuitry from damage caused by lightning strikes, the system includes a lightning arrester, generally designated 20. As shown in FIG. 2, the transmitter includes first and second output terminals 22 and 24 for connection with the wire loop antenna 12. The transmitter also includes a ground terminal 25 which is electrically connected to ground via a grounding rod 26. When desired, additional grounding rods may also be employed.

The first output terminal 22 of the transmitter 10 is connected with a first terminal 32 of the wire loop antenna 12 by a first conductor 33. Similarly, the second output terminal 24 of the transmitter 10 is connected with a second terminal 34 of the wire loop antenna 12 by a second conductor 35.

A first choke coil 43 is connected along the first conductor 33 between the first terminal 22 of the transmitter 10 and the first terminal 32 of the wire loop antenna 12. Likewise, a second choke coil 45 is connected along the second conductor 35 between the second terminal 24 of the transmitter 10 and the second terminal 34 of the wire loop antenna 12.

A first threshold-voltage conduction device 53 is electrically connected between ground 26 and the first conductor 33 on the transmitter side of the first choke coil 43. More specifically, the first threshold-voltage conduction device 53 is connected between ground 26 and a connection 54 on the first conductor 33 located between the first terminal 22 of the transmitter 10 and the first choke coil 43. The first threshold-voltage conduction device 53 becomes conductive so as to ground the first conductor 33 on the transmitter side of the first choke coil 43 whenever the voltage across the device 53 reaches a first predetermined threshold.

As shown in FIG. 2, the first threshold-voltage conduction device 53 is in the form of a Zener diode. Preferably, the Zener diode is a Tranzorb diode of the type manufactured by General Instrument Corporation under part No. 1.5KE47C. The Zener diode 53 becomes conductive so as to ground the first conductor 33 when the voltage across the Zener diode 53 reaches the breakdown voltage. Preferably, the Zener diode has a power requirement of approximately 1.5 KW and a breakdown voltage of approximately 47 volts. As such, the first predetermined threshold is established at a level of approximately 47 volts.

A second threshold-voltage conduction device 55 is electrically connected between ground 26 and the second conductor 35 on the transmitter side of the second choke coil 45. More specifically, the second threshold-voltage conduction device 55 is connected between ground 26 and a connection 56 on the second conductor 35 located between the second terminal 24 of the transmitter 10 and the second choke coil 45. The second threshold-voltage conduction device 53 becomes conductive so as to ground the second conductor 35 on the transmitter side of the second choke coil 45 whenever the voltage across the device 55 reaches a second predetermined threshold.

As shown in FIG. 2, the second threshold-voltage conduction device 55 is in the form of a Zener diode. Preferably, the Zener diode is a Tranzorb diode of the type manufactured by General Instrument Corporation under part No. 1.5KE47C. The Zener diode 55 becomes conductive so as to ground the second conductor 35 whenever the voltage across the Zener diode 55 reaches the breakdown voltage. Preferably, the Zener diode a power requirement of approximately 1.5 KW and a breakdown voltage of approximately 47 volts. As such, the second predetermined threshold is established at a level of approximately 47 volts.

Preferably, the first and second thresholds are established at approximately the same level. The first and second thresholds are set at sufficiently high levels above the normal operational level of the output signal from the transmitter 10 so that the devices 53 and 55 do not interfere with the normal transmission of the output signal from the transmitter 10 to the wire loop antenna 12.

A third threshold-voltage conduction device 63 is electrically connected between ground 62 and the first conductor 33 on the antenna side of the first choke coil 43. As shown in FIG. 2, the third threshold-voltage conduction device 63 is electrically connected between ground 62 and a connection 64 on the first conductor 35 located between the first choke coil 43 and the first terminal 32 of the antenna 12. The third threshold-voltage conduction device 63 becomes conductive so as to ground the first conductor 33 on the antenna side of the first choke coil 43 whenever the voltage across the device 63 reaches a third predetermined threshold.

The third threshold-voltage conduction device is in the form of a gas tube of the type manufactured by Joslyn under part No. 2027-15-BTI. The gas tube 63 handles surge currents of approximately 10 KA and has a sparkover voltage of approximately 150 volts. The tube 63 becomes conductive to ground the first conductor 33 to ground 62 when the voltage across the tube 63 reaches the third predetermined threshold established by the sparkover voltage of 150 volts.

A fourth threshold-voltage conduction device 65 is electrically connected between ground 62 and the second conductor 35 on the antenna side of the second choke coil 45. As shown in FIG. 2, the fourth threshold-voltage conduction device 65 is electrically connected between ground 62 and a connection 66 on the second conductor located between the second choke coil 45 and the second terminal 34 of the antenna 12. The fourth threshold-voltage conduction device 65 becomes conductive so as to ground the second conductor 35 on the antenna side of the second choke coil 45 whenever the voltage across the device 65 reaches a fourth predetermined threshold.

The fourth threshold-voltage conduction device is in the form of a gas tube of the type manufactured by Joslyn under part No. 2027-15-BTI. The gas tube 65 handles surge currents of approximately 10 KA and has a sparkover voltage of approximately 150 volts. The tube 65 becomes conductive to ground the second conductor 35 to ground 62 when the voltage across the tube 65 reaches the fourth predetermined threshold established by the sparkover voltage of 150 volts.

Preferably the third and fourth thresholds are established at approximately the same level. The third and fourth thresholds are set at a sufficiently high level above the normal operational level of the output signal from the transmitter so that the devices 63 and 65 do not interfere with the normal transmission of the output signal from the transmitter 10 to the wire loop antenna 12.

The lightning arrester 20 also includes a fifth threshold-voltage conduction device 73 which is electrically connected across the first and second conductors 33 and 35 on the antenna side of the choke coils 43 and 45. As shown in FIG. 2, the fifth threshold-voltage conduction device 73 is connected from a connection 74 on the first conductor 33 located between the first choke coil 43 and the first terminal 32 of the antenna 12 and a connection 76 on the second conductor 35 located between the second choke coil 45 and the second terminal 34 of the antenna 12. The fifth threshold-voltage conduction device becomes conductive to electrically short the first conductor 33 with the second conductor 35 when the voltage across the fifth threshold-voltage conduction device reaches a fifth predetermined threshold. Shorting of the conductors 33 and 35 serves to eliminate or at least minimize the voltage difference between the conductors under a fault condition such as a lightning strike.

Preferably, the fifth threshold-voltage conduction device 73 is in the form of a gas tube of the type manufactured by Joslyn under part No. 2027-15-BT1-. The tube 73 handles surge currents of approximately 10 KA and has a sparkover voltage of approximately 150 volts. As such, the fifth predetermined threshold is established by the 150 volt level. This is approximately the same level as the third and fourth predetermined thresholds.

The resistance of the transmitting antenna 12 is relatively low and is on the order of 4 to 5 ohms. Since the transmitting antenna 12 has relatively low resistance, no resistors are included in the lightning arrester 20.

The first and second choke coils 43 and 44 are inductors of the type manufactured by Glenn Magnetics under part No. 1903. The choke coils have inductance on the order of 40–50 μH. The inductance of the choke coils is selected to choke off relatively high frequency impulses resulting from lightning strikes while not adversely attenuating the 10 Khz output signal from the transmitter during normal operation. The choke coils serve to impede rapid current changes resulting from lightning strikes so that the resulting voltages across the choke coils cause gas tubes 63, 65 or 73 to spark over. As a result, conductors 33 and 35 are then respectively grounded on the antenna side of the choke coils at ground 62. If voltages in excess of the breakdown voltage of the Zener diodes 53 and 55 are present on the transmitter side of the choke coils 43 and 45, the Zener diodes will then conduct in order to respectively ground the first and second conductors 33 and 35 to ground 26. As such, the transmitter circuitry is effectively protected from lightning strikes.

From the foregoing description, it can be seen that the present invention provides an effective lightning-resistant system for controlling the movement of an animal relative to an outdoor area. It should be recognized by those skilled in the art that changes or modifications may be made to the above-described embodiments without departing from the broad inventive concept of the invention. Accordingly, it should be understood that the present invention is not limited to the particular embodiments disclosed herein, but is intended to cover all modifications and changes which are within the scope and spirit of the appended claims.

What is claimed is:

1. An animal control system with lightning arrester for controlling the movement of an animal relative to a predetermined outdoor area comprising:
   (a) a signal transmitter for producing a signal of predetermined frequency, the signal transmitter having first and second output terminals;
   (b) a wire loop antenna positioned at said predetermined outdoor area and electrically connected with the transmitter for transmitting said signal at said predetermined outdoor area, the antenna having a first terminal connected with the first terminal of the transmitter and a second terminal connected with the second terminal of the transmitter;
   (c) a portable receiver carried by the animal responsive to said signal from said antenna for producing an animal control output to the animal when the animal moves into a selected vicinity of the antenna so that the movement of the animal is controlled at the predetermined area; and
   (d) a lightning arrester electrically connected between the transmitter and the antenna, said lightning arrester including:
      (1) a first conductor electrically connected between the first terminal of the transmitter and the first terminal of the antenna;
      (2) a second conductor electrically connected between the second terminal of the transmitter and the second terminal of the antenna;
      (3) a first choke coil electrically connected along the first conductor;
      (4) a second choke coil electrically connected along the second conductor;
      (5) a first threshold-voltage conduction device electrically connected between ground and a connection on the first conductor located between the first terminal of the transmitter and the first choke coil, the first threshold-voltage conduction device becoming conductive when voltage across the first threshold-voltage conduction device reaches a first predetermined threshold;
      (6) a second threshold-voltage conduction device electrically connected between ground and a connection on the second conductor located between the second terminal of the transmitter and the second choke coil, the second threshold-voltage conduction device becoming conductive when voltage across the second threshold-voltage conduction device reaches a second predetermined threshold;
      (7) a third threshold-voltage conduction device electrically connected between ground and a connection on the first conductor located between the first choke coil and the first terminal of the antenna, the third threshold-voltage conduction device becoming conductive when voltage across the third threshold-voltage conduction device reaches a third predetermined threshold; and
      (8) a fourth threshold-voltage conduction device electrically connected between ground and a connection on the second conductor located between the second terminal of the antenna and the second choke coil, the fourth threshold-voltage conduction device becoming conductive when voltage across the fourth threshold-voltage conduction device reaches a fourth predetermined threshold.

2. The system in accordance with claim 1 wherein the lightning arrester includes a fifth threshold-voltage conduction device connected across the first and second conductors from a connection on the first conductor located between the first choke coil and the first terminal of the antenna to a connection on the second conductor located between the second choke coil and the second terminal of the antenna, the fifth threshold-voltage conduction device becoming conductive when voltage across the fifth threshold-voltage conduction device reaches a fifth predetermined threshold.

3. The system in accordance with claim 2 wherein the fifth threshold-voltage conduction device includes a gas tube.

4. The system in accordance with claim 2 wherein the first and second thresholds are each at a first level and wherein the third, fourth and fifth thresholds are each at a second level higher than the first level.

5. The system in accordance with claim 4 wherein the first and second threshold-voltage conduction devices each include a Zener diode and wherein the third, fourth, and fifth threshold-voltage conduction devices each include a gas tube.

6. The system in accordance with claim 2 wherein the first and second threshold-voltage conduction devices each include a Zener diode and wherein the third, fourth, and fifth threshold-voltage conduction devices each include a gas tube.

7. The system in accordance with claim 1 wherein the third and fourth threshold-voltage conduction devices each include a gas tube.

8. The system in accordance with claim 1 wherein the first and second threshold-voltage conduction devices each include a Zener diode.

9. The system in accordance with claim 8 wherein the third and fourth threshold-voltage conduction devices each include a gas tube.

10. The system in accordance with claim 1 wherein the first and second thresholds are each at a first level and wherein the third and fourth thresholds are each at a second level higher than the first level.

11. The system in accordance with claim 10 wherein the first and second threshold-conduction devices each include a Zener diode and wherein the third and fourth threshold conduction devices each include a gas tube.

12. An animal control system with lightning arrester for controlling the movement of an animal relative to a predetermined outdoor area comprising:
   (a) a signal transmitter for producing a signal of predetermined frequency, the signal transmitter having first and second output terminals;
   (b) a wire loop antenna positioned at said predetermined outdoor area and electrically connected with the transmitter for transmitting said signal at said predetermined outdoor area, the antenna having a first terminal connected with the first terminal of the transmitter and a second terminal connected with the second terminal of the transmitter;
   (c) a portable receiver carried by the animal responsive to said signal from said antenna for producing an animal control output to the animal when the animal moves into a selected vicinity of the antenna so that the movement of the animal is controlled at the predetermined area; and (d) a lightning arrester electrically connected between the transmitter and the antenna, said lightning arrester consisting essentially of:

(1) a first conductor electrically connected between the first terminal of the transmitter and the first terminal of the antenna;

(2) a second conductor electrically connected between the second terminal of the transmitter and the second terminal of the antenna;

(3) a first choke coil electrically connected along the first conductor;

(4) a second choke coil electrically connected along the second conductor;

(5) a first threshold-voltage conduction device electrically connected between ground and a connection on the first conductor located between the first terminal of the transmitter and the first choke coil, the first threshold-voltage conduction device becoming conductive when voltage across the first threshold-voltage conduction device reaches a first predetermined threshold;

(6) a second threshold-voltage conduction device electrically connected between ground and a connection on the second conductor located between the second terminal of the transmitter and the second choke coil, the second threshold-voltage conduction device becoming conductive when voltage across the second threshold-voltage conduction device reaches a second predetermined threshold;

(7) a third threshold-voltage conduction device electrically connected between ground and a connection on the first conductor located between the first choke coil and the first terminal of the antenna, the third threshold-voltage conduction device becoming conductive when voltage across the third threshold-voltage conduction device reaches a third predetermined threshold;

(8) a fourth threshold-voltage conduction device electrically connected between ground and a connection on the second conductor located between the second terminal of the antenna and the second choke coil, the fourth threshold-voltage conduction device becoming conductive when voltage across the fourth threshold-voltage conduction device reaches a fourth predetermined threshold; and (9) a fifth threshold-voltage conduction device connected across the first and second conductors from a connection on the first conductor located between the first choke coil and the first terminal of the antenna to a connection on the second conductor located between the second choke coil and the second terminal of the antenna, the fifth threshold-voltage conduction device becoming conductive when voltage across the fifth threshold-voltage conduction device reaches a fifth predetermined threshold.

13. The system in accordance with claim 12 wherein the fifth threshold-voltage conduction device includes a gas tube.

14. The system in accordance with claim 12 wherein the first and second thresholds are each at a first level and wherein the third, fourth and fifth thresholds are each at a second level higher than the first level.

15. The system in accordance with claim 14 wherein the first and second threshold-voltage conduction devices each include a Zener diode and wherein the third, fourth, and fifth threshold-voltage conduction devices each include a gas tube.

16. The system in accordance with claim 12 wherein the first and second threshold-voltage conduction devices each include a Zener diode and wherein the third, fourth, and fifth threshold-voltage conduction devices each include a gas tube.

* * * * *

UNITED STATES PATENT AND TRADEMARK OFFICE
CERTIFICATE OF CORRECTION

PATENT NO. : 4,996,945

DATED : March 5, 1991

INVENTOR(S) : THOMAS S. DIX, JR.

It is certified that error appears in the above-identified patent and that said Letters Patent is hereby corrected as shown below:

Title Page:

Abstract, line 17, after "Zener" delete "diode" and insert --diodes--;

Abstract, line 20, after "across one" delete "of both of" and insert --or both--;

Column 2, line 26, after "diode, is" delete "electrical" and insert --electrically--;

Column 5, line 17, after "Zener diode" insert --has--; and

Column 6, line 34, after "part No." delete "2027-15-BT1-" and insert --2027-15-BT1--.

Signed and Sealed this

Thirteenth Day of April, 1993

*Attest:*

STEPHEN G. KUNIN

*Attesting Officer*     *Acting Commissioner of Patents and Trademarks*